(12) United States Patent
Yoshitake et al.

(10) Patent No.: US 7,186,440 B2
(45) Date of Patent: Mar. 6, 2007

(54) PROCESS FOR PRODUCING HYDROPHOBIC SILICA POWDER

(75) Inventors: Keiko Yoshitake, Sodegaura (JP); Hirokazu Kato, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 11/477,364

(22) Filed: Jun. 30, 2006

(65) Prior Publication Data

US 2007/0003701 A1    Jan. 4, 2007

(30) Foreign Application Priority Data

Jul. 4, 2005    (JP)    ............... 2005-194765

(51) Int. Cl.
*C01B 33/146* (2006.01)
*B01J 2/30* (2006.01)
*C04B 14/04* (2006.01)

(52) U.S. Cl. ............ 427/220; 106/287.11; 106/287.34; 106/482; 106/490; 427/221; 427/443.2

(58) Field of Classification Search .......... 106/287.11, 106/287.34, 482, 490; 427/220, 221, 443.2
See application file for complete search history.

(56) References Cited

U.S. PATENT DOCUMENTS

| | | | |
|---|---|---|---|
| 5,009,874 A | | 4/1991 | Parmentier et al. |
| 5,013,772 A | * | 5/1991 | Fujiki et al. .................. 523/213 |
| 5,039,736 A | * | 8/1991 | Fujiki .......................... 524/730 |
| 5,908,660 A | * | 6/1999 | Griffith et al. ............... 427/220 |
| 5,919,298 A | | 7/1999 | Griffith et al. |
| 6,025,455 A | | 2/2000 | Yoshitake et al. |
| 6,051,672 A | | 4/2000 | Burns et al. |
| 6,184,408 B1 | | 2/2001 | Burns et al. |
| 6,521,290 B1 | | 2/2003 | Kudo et al. |
| 6,579,929 B1 | * | 6/2003 | Cole et al. .................... 524/492 |
| 6,855,759 B2 | | 2/2005 | Kudo et al. |
| 2003/0035888 A1 | | 2/2003 | Eriyama et al. |
| 2006/0171872 A1 | * | 8/2006 | Adams ......................... 423/335 |

FOREIGN PATENT DOCUMENTS

| | | |
|---|---|---|
| EP | 0 287 418 | 10/1988 |
| EP | 0 881 192 | 12/1998 |
| EP | 0 928 818 A2 | 7/1999 |
| JP | A 58-145614 | 8/1983 |
| JP | A 03-187913 | 8/1991 |
| JP | A 07-286095 | 10/1995 |
| JP | A 2000-044226 | 2/2000 |
| JP | A 2000-080201 | 3/2000 |
| JP | A 2000-256008 | 9/2000 |
| JP | A 2000-327321 | 11/2000 |
| JP | A 2002-256170 | 9/2002 |
| JP | A 2004-168559 | 6/2004 |
| WO | WO 01/55030 A2 | 8/2001 |

* cited by examiner

*Primary Examiner*—Anthony J. Green
(74) *Attorney, Agent, or Firm*—Oliff & Berridge, PLC

(57) ABSTRACT

A process for producing a hydrophobic silica powder, comprises the steps for hydrophobic treatment of: adding to a silica sol in mixed solvent having a silica concentration of 5 to 50 mass % obtained by mixing an aqueous silica sol containing hydrophilic colloidal silica having a specific surface area of 5.5 to 550 m²/g with a hydrophilic organic solvent in a mass ratio of 0.12 to 2.5 based on water in the aqueous silica sol, a disilazane compound of formula (1)

$$(R^1_3Si)_2NH \qquad (1)$$

wherein each $R^1$ is $C_{1-6}$alkyl group or phenyl group that is selected independently of one another, in an amount of 0.1 to 20 mmol per surface area 100 m² of the hydrophilic colloidal silica, to obtain a mixture of the silica sol in mixed solvent and the disilazane compound; and heating the mixture at a temperature of 50 to 100° C. for aging it to obtain a slurry dispersion of hydrophobic treated colloidal silica. The process provides a hydrophobic silica powder through a simple hydrophobic treatment step.

6 Claims, No Drawings

PROCESS FOR PRODUCING HYDROPHOBIC SILICA POWDER

BACKGROUND OF THE INVENTION

1. Field of the Art

The present invention relates to a process for producing a hydrophobic silica powder having an excellent re-dispersibility in organic solvents by using an aqueous silica sol as a starting material.

2. Description of the Related Art

Thus far, as a silica base material used for production of hydrophobic silica powder, precipitated silica and fine silica produced by flame thermal decomposition of chlorosilane (generally called fumed silica) have been frequently used. The methods for hydrophobic treatment include a method for hydrophobic treatment comprising bringing a silica powder into contact with a hydrophobicity-affording agent such as a surfactant or silicone oil, or a gas of silylating agent such as alkylhalogeno silane, alkylalkoxy silane, alkyldisilazane or the like, or a method for hydrophobic treatment comprising bringing a silica powder into contact with a silylating agent in a hydrophilic organic solvent containing water.

However, in any methods for hydrophobic treatment, in case where a precipitated silica or a fumed silica is used, a silica base material itself is aggregated, and thus it was impossible to obtain a hydrophobic silica powder having an excellent dispersibility.

In fact, the following hydrophobic treatments by using a precipitated silica or a fumed silica are disclosed. Any methods did not disclose a relation between primary particle diameter of a silica base material and aggregated particle diameter after hydrophobic treatment, and obtain no hydrophobic silica powder having a high dispersibility.

JP-A-2000-327321 (2000) disclosed a process for producing a hydrophobic precipitated silica comprising bringing an aqueous suspension of hydrophilic precipitated silica into contact with a catalytic amount of an acid and an organosilane compound in the presence of water-miscible organic solvent in an amount sufficient for promoting the reaction of the organic silicon compound with the hydrophilic precipitated silica.

JP-A-07-286095 (1995) disclosed a process for obtaining a silica oxide particle having a mean primary particle diameter of 5 to 50 nm, a surface treated with hexamethyldisilazane to block 40% or more of silanol groups on the particle surface, and a residual silanol group concentration of $1.5/nm^2$ or less.

JP-A-2000-256008 (2000) disclosed a hydrophobic fumed silica and a production process thereof characterized in that a fumed silica is subjected to a hydrophobic treatment with an organic silicon compound such as hexamethyldisilazane, and the resulting hydrophobic fumed silica has a bulk density of 80 to 300 g/l, OH group per unit surface of $0.5/nm^2$ or less, and aggregated particles having a particle diameter of 45 μm or more in a concentration of 2000 ppm or less.

JP-A-2002-256170 (2002) disclosed a process for producing a hydrophobic silica powder characterized by treating a fumed silica with polysiloxane and then treating with a trimethyl silylating agent.

JP-A-2004-168559 (2004) disclosed a highly dispersible, hydrophobic silica powder and a production process thereof characterized by performing a primary surface treatment with a silicone oil treatment agent, a disintegration after the primary surface treatment, and a secondary surface treatment with an alkyl silazane treatment agent after the disintegration.

On the other hand, methods are also known by using a silica sol having a high dispersibility as a starting material to make it hydrophobic. A hydrophobic silica powder is obtained by dispersing a silica sol in a hydrophilic organic solvent such as an alcohol, or in a mixed solvent of water with a hydrophilic organic solvent, reacting with a silylating agent such as an alkylhalogeno silane, an alkylalkoxy silane, an alkyl disilazane or the like and then removing the solvent. In these methods, these methods have disadvantages that a step of producing a sol dispersed in an organic solvent is complicated, the replacement or removal by distillation of the solvent is required after the reaction, and the like. In addition, the hydrophobic treatment with an alkylhalogeno silane has a disadvantage that corrosive acids are produced as by-products. Among the alkylalkoxy silanes, a monoalkoxy silane has a slightly low reactivity, a dialkoxy silane or a trialkoxy silane tends to cause a condensation reaction, and the condensation reaction often causes cross-linking reaction between particles. Therefore, it is difficult to obtain any hydrophobic silica powder having a high dispersibility. It is also difficult to remove self-condensates of alkoxy silane. Further, as an alkyl disiloxane is required to be reacted with a large amount of a mineral acid as a catalyst, this method has disadvantages that corrosive problems occur and a step for removing the acid as the catalyst from the hydrophobic silica becomes tedious. Hereinafter, examples of disclosed arts are mentioned.

JP-A-58-145614 (1983) disclosed a process for producing a silica powder having $C_{1-36}$ silyl groups bonded on the surface of colloidal silica in a rate of 1 to 100 per surface area 10 $nm^2$, and homogeneous re-dispersibility in an organic solvent, comprising adding a silylating agent in an organo silica sol having a water content of 10 mass % or less, reacting each other and then distilling off the solvent.

JP-A-2000-080201 (2000) disclosed a process for producing a hydrophobic treated colloidal silica having a mean particle diameter of 4 nm or more, comprising performing a hydrophobic treatment by adding a hydrophilic colloidal silica in a mixed solvent of concentrated hydrochloric acid, isopropanol and hexamethyldisiloxane, extracting the resulting hydrophobic colloidal silica with a hydrophobic organic solvent, refluxing under heating, and then adding a silane compound, and refluxing under heating.

JP-A-2000-044226 (2000) disclosed a process for producing a surface-treated silica, comprising hydrolyzing a tetraalkoxy silane compound with a basic compound to prepare a aqueous hydrophilic fine silica dispersion and removing alcohol, then subjecting the fine silica to hydrophobic treatment with alkyltrialkoxy silane compound, replacing the solvent by a ketone solvent, triorganosilylating the reactive groups remaining on the surface of the fine silica with a silazane compound or a trialkylalkoxy silane compound, and finally distilling off the solvent under a reduced pressure.

JP-A-03-187913 (1991) disclosed a process for producing a silica powder excellent in dispersibility the surface of which is silylated, comprising reacting a methanol-dispersion silica obtained by hydrolyzing an alkyl silicate in methanol with a trimethyl silylating agent added in an amount of 5 mol % or more based on 1 mol of silica, and then distilling off excess trimethyl silylating agent and the dispersion solvent. For example, the hydrophobic silica powder is obtained by adding methoxy trimethyl silane in an amount of 20 mol % based on 1 mol of silica, to a methanol-dispersion silica obtained by hydrolyzing tetramethoxy silane in methanol in the presence of aqueous ammonia, recovering excess silylating agent and drying.

SUMMARY OF THE INVENTION

An object of the present invention is to provide a process for efficiently producing a hydrophobic silica powder excellent in re-dispersibility in organic solvents.

The process for producing a hydrophobic silica powder according to the present invention comprises the steps for hydrophobic treatment of: adding to a silica sol in mixed solvent having a silica concentration of 5 to 50 mass % obtained by mixing an aqueous silica sol containing hydrophilic colloidal silica having a specific surface area of 5.5 to 550 m$^2$/g with a hydrophilic organic solvent in a mass ratio of 0.12 to 2.5 based on water of the aqueous silica sol, a disilazane compound of formula (1)

$(R^1_3Si)_2NH$         (1)

wherein each $R^1$ is $C_{1-6}$alkyl group or phenyl group that is selected independently of one another, in an amount of 0.1 to 20 mmol per surface area 100 m$^2$ of the hydrophilic colloidal silica, to obtain a mixture of the silica sol in mixed solvent and the disilazane compound; and heating the mixture at a temperature of 50 to 100° C. for aging to obtain a slurry dispersion of hydrophobic treated colloidal silica.

The preferable mode of the present invention is as follows:

the process for producing a hydrophobic silica powder, wherein the steps for hydrophobic treatment are followed by a step in which the obtained slurry dispersion of hydrophobic treated colloidal silica is heated at a temperature of 50 to 100° C. with stirring for aging, thereby the hydrophobic treated colloidal silica is granulated in a granular shape in the dispersion.

The embodiments of the present invention are as follows:

the process for producing a hydrophobic silica powder, comprising the steps (A), (B), (C) and (D) of:

(A): hydrophobic treatment step of adding to a silica sol in mixed solvent having a silica concentration of 5 to 50 mass % obtained by mixing an aqueous silica sol containing hydrophilic colloidal silica having a specific surface area of 5.5 to 550 m$^2$/g with a hydrophilic organic solvent in a mass ratio of 0.12 to 2.5 based on water of the aqueous silica sol, a disilazane compound of formula (1)

$(R^1_3Si)_2NH$         (1)

wherein each $R^1$ is $C_{1-6}$alkyl group or phenyl group that is selected independently of one another, in an amount of 0.1 to 20 mmol per surface area 100 m$^2$ of the hydrophilic colloidal silica, to obtain a mixture of the silica sol in mixed solvent and the disilazane, and heating the mixture at a temperature of 50 to 100° C. for aging to obtain a slurry dispersion of hydrophobic treated colloidal silica;

(B): step of heating the slurry dispersion of hydrophobic treated colloidal silica obtained in the step (A) at a temperature of 50 to 100° C. with stirring for aging, thereby granulating the hydrophobic treated colloidal silica in a granular shape in the dispersion;

(C): step of separating the hydrophobic treated colloidal silica granulated in a granular shape that is obtained in the step (B) from a liquid phase of the dispersion; and (D): step of drying a cake of the granular hydrophobic treated colloidal silica obtained in the step (C); and the process for producing a hydrophobic silica powder, wherein hexamethyl disilazane is used as the disilazane compound of formula (1).

Aqueous silica sols having several particle diameters are applicable to the process of the present invention. The use of an aqueous silica sol having a high dispersibility as a silica base material makes possible to provide a hydrophobic silica powder having a high re-dispersibility in several organic solvents even after hydrophobic treatment. In addition, the mixing of an aqueous silica sol with a hydrophilic organic solvent promotes contact between a disilazane compound and a hydrophilic colloidal silica. Further, the phase-separation between a slurry, preferably granular hydrophobic treated colloidal silica and a liquid phase after the hydrophobic treatment makes possible to take out silica subjected to hydrophobic treatment through a simple process such as filtering or the like. Consequently, the process of the present invention makes possible to produce hydrophobic silica powders by an easy hydrophobic treatment step by use of a simple apparatus.

The hydrophobic silica powder obtained by the present invention is useful for external agents for toner used for electrophotography, internal agents used for resins, hard coat agents, water repellency-affording agents, flame retardants and the like.

DESCRIPTION OF THE PREFERRED EMBODIMENTS

The aqueous silica sol used in the present invention is an aqueous silica sol containing a hydrophilic colloidal silica having a specific surface area of 5.5 to 550 m$^2$/g, preferably 5.5 to 300 m$^2$/g, and having a silica concentration of 5 to 55 mass %. An aqueous silica sol having a silica concentration of 10 to 55 mass % is preferable. The aqueous silica sol can be produced according to any known process by using for example water glass as a starting material.

The particle diameter of the hydrophilic colloidal silica is calculated through the equation: D (nm)=2720/S wherein S (m$^2$/g) is a specific surface area determined based on nitrogen adsorption method (BET method). Therefore, the particle diameter of the hydrophilic colloidal silica based on BET method is 5 nm or more, preferably 9 nm or more. In case where is used the aqueous silica sol containing a hydrophilic colloidal silica having a particle diameter based on BET method less than 5 nm, it is difficult to increase the concentration of the aqueous silica sol, and further the surface treatment requires a larger amount of silylating agent per unit mass of the colloidal silica.

It is preferable to use an aqueous silica sol containing no free alkali metal ion. The use of an alkaline aqueous silica sol containing free alkali metal ion as a starting material may cause a lowering in the reactivity of the silylating agent with the silanol group on the surface of the hydrophilic colloidal silica, or a lowering in the reaction rate of the silylating agent, or affect adverse effect on the hydrophobicity of the hydrophobic silica powder. The aqueous silica sol containing no free alkali metal ion can be obtained for example by removing free Na ion from an alkaline silica sol containing Na ion through cation exchange method or the like. On the other hand, an aqueous silica sol stabilized with $NH_3$, amine or the like can be used as a starting material.

The hydrophobicity-affording agents used in the present invention are disilazane compounds. Concretely, it is preferable that the agents are at least one selected from the group consisting of hexamethyldisilazane, di-n-butyltetramethyldisilazane, divinyltetramethyldisilazane, diphenyltetramethyldisilazane, and tetraphenyldimethyldisilazane. Hexamethyldisilazane is particularly preferable. The disilazane compound is added to a silica sol in mixed solvent obtained by mixing an aqueous silica sol with a hydrophilic organic solvent in an amount of 0.1 to 20 mmol, preferably 0.5 to 10 mmol per surface area 100 $m^2$ of the hydrophilic colloidal silica. Excess disilazane compound is not consumed for hydrophobic reaction, and is inefficient also in economic view. On the other hand, shortage of the disilazane compound causes a lowering in hydrophobicity.

The form of the product obtained after the hydrophobic treatment according to the present invention is a slurry dispersion of the hydrophobic treated colloidal silica or a granular product of the hydrophobic treated colloidal silica that is required to be in a state being separated from the liquid phase. The "slurry" state means a state that fine particles formed by aggregation of colloidal silica are dispersed in a mixed solvent, and that they can be separated by filtration by use of a commercially available filter paper. In addition, the "granular" state means a state that a hydrophobic treated colloidal silica is granulated in a size of 0.1 mm or more in a slurry dispersion. In order to obtain a slurry dispersion or a granular product of the hydrophobic treated colloidal silica, the mass ratio of the hydrophilic organic solvent and water in the silica sol in mixed solvent is important.

The silica sol in mixed solvent in the present invention requires the presence of a hydrophilic organic solvent in an amount sufficient for promoting contact between a disilazane compound and a hydrophilic colloidal silica. The silica sol in mixed solvent is preferably prepared by mixing a hydrophilic organic solvent in a mass ratio of 0.12 to 2.5 based on water in the aqueous silica sol. If the mass ratio is less than 0.12, the solubility of the disilazane compound in the mixed solvent is low, the contact between the disilazane compound and the hydrophilic colloidal silica becomes insufficient, and affinity between the hydrophobic treated colloidal silica and the mixed solvent is lowered. Thereby, the production thereof often becomes difficult because the hydrophobic treated colloidal silica is separated out in clumps with progress of the hydrophobic reaction. On the other hand, if the mass ratio is more than 2.5, the hydrophobic treated colloidal silica remains a state dispersed in a sol, provides no slurry dispersion and it causes a case where separation by filtration can not be carried out or a case where it becomes unstable in the hydrophobic treatment and increases in viscosity and becomes a gel. In the latter case, the hydrophobic treated colloidal silica can not be substantially produced.

The hydrophilic organic solvent is preferably alcohols having a boiling point of 100° C. or less such as methanol, ethanol, 1-propanol, isopropanol, tert-butanol or the like that has no compatibility limit with water, and isopropanol is most preferable from the standpoint of miscibility with both water and disilazane compounds, and easiness of removal of the dry step. In addition, the suitable mass ratio between the hydrophilic organic solvent and water in the silica sol in mixed solvent depends on the kind of the hydrophilic organic solvents. The better miscibility between the hydrophilic organic solvent and water, and between the hydrophilic organic solvent and disilazane compound is, the smaller the mass ratio of the hydrophilic organic solvent based on water in the silica sol in mixed solvent is.

The silica sol in mixed solvent has preferably a silica concentration of 5 to 50 mass %. If the silica concentration in the silica sol in mixed solvent is less than 5 mass %, the production efficiency of the hydrophobic silica powder becomes low, and the required amount of the disilazane compound per surface area of the hydrophilic colloidal silica becomes large because the efficiency of contact between the hydrophilic colloidal silica and the disilazane compound is lowered. Thus, the silica concentration less than 5 mass % is not preferable. In addition, if the silica concentration is more than 50 mass %, the viscosity of the silica sol in mixed solvent increases in the hydrophobic treatment, and thus it becomes difficult to stir and to carry out homogeneous hydrophobic treatment.

The silica concentration in the silica sol in mixed solvent and the mass ratio between the hydrophilic organic solvent and water that are suitable for obtaining the slurry dispersion of the hydrophobic treated colloidal silica depend on particle diameter based on BET method of the hydrophilic colloidal silica and the kind of the hydrophilic organic solvent. In addition, there is a following tendency in the preparation of the silica sol in mixed solvent having a suitable composition: the smaller the particle diameter based on BET method of the hydrophilic colloidal silica is, the larger the mass of the hydrophilic organic solvent to be added based on the mass of the hydrophilic colloidal silica is.

In the present invention, the temperature of the silica sol in mixed solvent on the addition of disilazane compound is not specifically limited, but it is preferable to adjust the temperature of the silica sol in mixed solvent on the addition of disilazane compound at a temperature of 50 to 70° C. in order to promote the reaction between the hydrophilic colloidal silica and disilazane compound. When the temperature exceeds 70° C., a violent reaction occurs, and foam formation often takes place by ammonia generated with the reaction of the disilazane. In addition, it is preferable to promote the hydrophobic reaction until the silica sol in mixed solvent becomes a slurry dispersion of the hydrophobic treated colloidal silica by heating the silica sol in mixed solvent in which the disilazane compound was added at a temperature of 50 to 100° C. and aging for 0.5 hour or more. In case where the aging time is less than 0.5 hour, the hydrophobic treatment often becomes insufficient. The separation of the hydrophobic treated colloidal silica from the liquid phase becomes easy by making it the slurry state. Therefore, the hydrophobic treated colloidal silica can be taken out by easy process such filtration or the like.

Further, the steps for hydrophobic treatment may be followed by a step in which the obtained slurry dispersion of hydrophobic treated colloidal silica is heated at a temperature of 50 to 100° C. with stirring for aging, thereby the hydrophobic treated colloidal silica is granulated in a granular shape of 0.1 mm or more in the dispersion. The efficiency of the separation process carried out after the hydrophobic treatment is remarkably improved by granulating in a granular shape through stirring procedure. The temperature of the liquid phase in the granulating process may be the same as that of the hydrophobic treatment process, but the granulating process can be improved by adjusting the temperature of the liquid phase at a temperature higher than that of the hydrophobic treatment process. The particle size and particle size distribution of the granule are not specifically limited, but it is preferable that the mean size is 5 mm or less. In case where it is more than 5 mm, the resistance against stirring often becomes high during granulating process, and it often becomes difficult to take out from the reactor after the granulating process.

After the hydrophobic treatment, separation step from the liquid phase is not specifically limited, but the slurry or the granular hydrophobic treated colloidal silica and the liquid phase can be separated by any known methods. For example, the methods include separation through filtration, centrifugation, distillation-out of the liquid phase or the like.

The drying method of the cake of the slurry or the granular hydrophobic treated colloidal silica obtained in the separation process is not specifically limited, but the drying method includes known drying methods such as methods by use of a hot-air drying, a microwave drying, an infrared ray drying, ultrasonic wave drying, vacuum drying or the like. The temperature for drying is not specifically limited, but it is preferably 200° C. or less. When the temperature exceeds 200° C., it is liable to cause the binding of the primary particles each other due to the condensation of silanol groups remaining on the surface of the hydrophobic treated colloidal silica. It is difficult to dissociate the binding by dry grinding and thus re-dispersibility of the hydrophobic silica powder in organic solvents is deteriorated. In addition, the separation process and the drying process can be carried out as a series of processes by use of an apparatus such as a filter dryer.

The hydrophobic silica powder obtained as mentioned above disperses homogeneously in most organic solvents such as alcohol, ketone, ether, aromatic hydrocarbon, aliphatic hydrocarbon and the like.

Further, it is able to reduce the time for drying by carrying out the grinding in the course of the drying process.

The dried hydrophobic treated silica can be ground with a mill for powder or the like to obtain hydrophobic silica in a form of powder. The method for grinding is not specifically limited, but dry grinding apparatuses such as a jet mill, a vibratory grinding mill, a ball mill, an attritor or the like can be used.

EXAMPLES

In each of Examples and Comparative Examples, hydrophobic treatment process and granulating process were performed under the following stirring condition.

Example 1

1-Liter glass reactor: internal diameter 85 mm
Pfaudler impeller (diameter 70 mm), 250 rotations per minute
Liquid temperature of granulating process: 74° C.

Examples 2 and 4

2-Liter glass reactor: internal diameter 130 mm
Pfaudler impeller (diameter 100 mm), 250 rotations per minute
Liquid temperature of granulating process: 75° C.

Examples 3 and 5

2-Liter glass reactor: internal diameter 130 mm
Pfaudler impeller (diameter 100 mm), 150 rotations per minute
Liquid temperature of granulating process: 76° C.

Comparative Examples 1, 3 and 5

1-Liter glass reactor: internal diameter 85 mm
Pfaudler impeller (diameter 70 mm), 200 rotations per minute Comparative Examples 2 and 4

1-Liter glass reactor: internal diameter 85 mm
Pfaudler impeller (diameter 70 mm), 500 rotations per minute Example 1

A commercially available acidic aqueous silica sol (trade name: SNOWTEX (registered trade mark)-O, manufactured by Nissan Chemical Industries, Ltd., silica concentration: 20 mass %, pH 3.0, particle diameter based on BET method: 12 nm) was concentrated on a rotary evaporator to a silica concentration of 33% to prepare a concentrated acidic aqueous silica sol. Then, in a 1 L-glass reactor equipped with a stirrer, a dropping funnel, a condenser and a thermometer, 450 g of the concentrated acidic aqueous silica-sol, 75 g of pure water, and 225 g of isopropanol (IPA) were added to prepare a silica sol in mixed solvent having a silica concentration of 20.0 mass %, an EPA concentration of 30.0 mass % and a water content of 50 mass %. The silica sol in mixed solvent was heated to 65° C., and 75 g (1.4 mmol per surface area 100 $m^2$ of the hydrophilic colloidal silica) of hexamethyldisilazane was added dropwise therein. The silica sol in mixed solvent was mixed for 30 minutes, then heated at 70° C. and aged for 1 hour to obtain a slurry dispersion of hydrophobic treated colloidal silica. Then, the slurry dispersion of hydrophobic treated colloidal silica was granulated in a granular shape by aging for 3 hours with stirring under a reflux condition. A granular hydrophobic treated colloidal silica and a liquid phase were separated by filtration through Buchner funnel (qualitative filter paper No. 131 manufactured by Advantec), and the cake of the obtained granular hydrophobic treated colloidal silica was dried at 120° C. Then, the dried granular hydrophobic treated colloidal silica was ground with a mill for powder, and further dried at 150° C. to obtain 150 g of hydrophobic silica powder. The obtained hydrophobic silica powder was re-dispersed in methyl ethyl ketone in a state of sol. Further, the hydrophobic silica powder was re-dispersed in each of other solvents of methanol, ethanol, isopropanol, methyl isobutyl ketone, ethyl acetate, toluene, methylmethacrylate monomer, polydimethylsiloxane, n-hexane or tetrahydofuran in a state of sol similarly to the case where methyl ethyl ketone was used.

Example 2

In a 2 L-glass reactor equipped with a stirrer, a dropping funnel, a condenser and a thermometer, 1200 g of an acidic aqueous silica sol (silica concentration: 31.5 mass %, pH 2.5, particle diameter based on BET method: 80 nm), 75 g of pure water, and 350 g of isopropanol (IPA) were added to prepare a silica sol in mixed solvent having a silica concentration of 23.3 mass %, an IPA concentration of 21.5 mass % and a water content of 55.2 mass %. The silica sol in mixed solvent was heated to 65° C., and 80 g (3.9 mmol per surface area 100 $m^2$ of the hydrophilic colloidal silica) of hexamethyldisilazane was added dropwise therein. The silica sol in mixed solvent was mixed for 30 minutes, then heated at 70° C. and aged for 1 hour to obtain a slurry dispersion of hydrophobic treated colloidal silica. Then, the slurry dispersion of hydrophobic treated colloidal silica was granulated in a granular shape by aging for 3 hours with stirring under a reflux condition. A granular hydrophobic treated colloidal silica and a liquid phase were separated by filtration through Buchner funnel (qualitative filter paper No. 131 manufactured by Advantec), and cake of the obtained granular hydrophobic treated colloidal silica was dried at 120° C. Then, the dried granular hydrophobic treated colloidal silica was ground with a mill for powder, and further dried at 200° C. to obtain 380 g of hydrophobic silica powder. The obtained hydrophobic silica powder was re-dispersed in methyl ethyl ketone in a state of sol.

Example 3

In a 2 L-glass reactor equipped with a stirrer, a dropping funnel, a condenser and a thermometer, 1430 g of an acidic aqueous silica sol (silica concentration: 35 mass %, pH 2.0) obtained by subjecting a commercially available alkaline aqueous silica sol (product name: MP-2040, manufactured by Nissan Chemical Industries, Ltd., silica concentration: 40 mass %, pH 9.4, particle diameter based on BET method: 120 nm) to a cation-exchange treatment, 270 g of pure water, and 300 g of isopropanol (IPA) were added to prepare a silica sol in mixed solvent having a silica concentration of 25.0 mass %, an IPA concentration of 15.0 mass % and a water content of 60.0 mass %. The silica sol in mixed solvent was heated to 65° C., and 86 g (5.0 mmol per surface area 100 $m^2$ of the hydrophilic colloidal silica) of hexamethyldisilazane was added dropwise therein. The silica sol in mixed solvent was mixed for 15 minutes, then heated at 70° C. and aged for 30 minutes to obtain a slurry dispersion of hydrophobic treated colloidal silica. Then, the slurry dispersion of hydrophobic treated colloidal silica was granulated in a granular shape by aging for 3 hours with stirring under a reflux condition. A granular hydrophobic treated colloidal silica and a liquid phase were separated by filtration through Buchner funnel (qualitative filter paper No. 131 manufactured by Advantec), and cake of the obtained granular hydrophobic treated colloidal silica was dried at 120° C. Then, the dried granular hydrophobic treated colloidal silica was ground with a mill for powder, and further dried at 200° C. to obtain 500 g of hydrophobic silica powder. The obtained hydrophobic silica powder was re-dispersed in methyl ethyl ketone in a state of sol.

Example 4

The procedures similar to those in Example 2 were performed except that the granular hydrophobic treated colloidal silica dried at 120° C. was dried at 200° C. without grinding with a mill for powder. The obtained hydrophobic silica powder was re-dispersed in methyl ethyl ketone in a state of sol.

Example 5

The procedures similar to those in Example 3 were performed except that the granular hydrophobic treated colloidal silica dried at 120° C. was dried at 200° C. without grinding with a mill for powder. The obtained hydrophobic silica powder was re-dispersed in methyl ethyl ketone in a state of sol.

Comparative Example 1

In a 1 L-glass reactor equipped with a stirrer, a dropping funnel, a condenser and a thermometer, 150 g of an acidic aqueous silica sol (silica concentration: 31.5 mass %, pH 2.5, particle diameter based on BET method: 80 nm), 270 g of pure water, and 30 g of isopropanol (IPA) were added to prepare a silica sol in mixed solvent having a silica concentration of 10.5 mass %, an IPA concentration of 6.7 mass % and a water content of 82.8 mass %. The silica sol in mixed solvent was heated to 65° C., and 10 g (3.9 mmol per surface area 100 $m^2$ of the hydrophilic colloidal silica) of hexamethyldisilazane was added dropwise therein. The added hexamethyldisilazane floated on the liquid surface without immediate mixing with the silica sol in mixed solvent. The silica sol in mixed solvent was mixed for 30 minutes, then heated at 70° C. and aged for 1 hour. However, no slurry dispersion of hydrophobic treated colloidal silica was obtained. Further, even after aging for 3 hours with stirring under a reflux condition, no slurry dispersion of hydrophobic treated colloidal silica was obtained. The state after the hydrophobic treatment remained in a sol. As separation by filtration through Buchner funnel (qualitative filter paper No. 131 manufactured by Advantec) could not be performed, the product in a state of sol was transferred in a metal vat and dried at 120° C. Because in the obtained product in a state of sol, the liquid phase was not separated, drying efficiency was remarkably deteriorated and thus it took a long time for drying. The dried hydrophobic treated colloidal silica was ground with a mill for powder, and dried at 200° C. to obtain 48 g of hydrophobic silica powder. Although the obtained hydrophobic silica powder was partly re-dispersed in methyl ethyl ketone, a precipitate that was not re-dispersed was also obtained.

Comparative Example 2

A commercially available acidic aqueous silica sol (trade name: SNOWTEX (registered trade mark)-O, manufactured by Nissan Chemical Industries, Ltd., silica concentration: 20 mass %, pH 3.0, particle diameter based on BET method: 12 nm) was concentrated on a rotary evaporator to a silica concentration of 33% to prepare a concentrated acidic aqueous silica sol. Then, in a 1 L-glass reactor equipped with a stirrer, a dropping funnel, a condenser and a thermometer, 200 g of the concentrated acidic aqueous silica sol, and 400 g of isopropanol (IPA) were added to prepare a silica sol in mixed solvent having a silica concentration of 11.0 mass %, an IPA concentration of 66.7 mass % and a water content of 22.3 mass %. The silica sol in mixed solvent was heated to 65° C., and 34 g (1.4 mmol per surface area 100 $m^2$ of the hydrophilic colloidal silica) of hexamethyldisilazane was added dropwise therein. The silica sol in mixed solvent was mixed for 30 minutes, then heated at 70° C. and aged for 1 hour. However, the aged mixture remained in a sol, and no slurry dispersion of hydrophobic treated colloidal silica was obtained. Further, after aging for 3 hours with stirring under a reflux condition, a product in a state of gel that was increased in viscosity was obtained and no slurry dispersion of hydrophobic treated colloidal silica could be obtained. The product was a hydrophobic treated silica in a state of gel. As separation by filtration through Buchner funnel (qualitative filter paper No. 131 manufactured by Advantec) could not be performed, the product in a state of gel was transferred in a metal vat and placed in a dryer at 120° C. Because the product remained to contain the liquid phase, drying efficiency was remarkably deteriorated and thus it took a long time for drying. The dried hydrophobic treated silica was ground with a mill for powder, and further dried at 150° C. to obtain 69 g of hydrophobic silica powder. Although the obtained hydrophobic silica powder was partly re-dispersed in methyl ethyl ketone, a precipitate that was not re-dispersed was also obtained.

Comparative Example 3

In a 1 L-glass reactor equipped with a stirrer, a dropping funnel, a condenser and a thermometer, 333 g of an acidic aqueous silica sol (silica concentration: 31.5 mass %, pH 2.5, particle diameter based on BET method: 80 nm), 87 g of pure water, and 30 g of isopropanol (IPA) were added to prepare a silica sol in mixed solvent having a silica concentration of 23.3 mass %, an IPA concentration of 5.0 mass % and a water content of 71.7 mass %. The silica sol in mixed solvent was heated to 65° C., and 10 g (3.9 mmol per surface area 100 $m^2$ of the hydrophilic colloidal silica) of hexamethyldisilazane was added dropwise therein. The added hexamethyldisilazane floated on the liquid surface without immediate mixing with the silica sol in mixed solvent. The silica sol in mixed solvent was mixed for 30 minutes, then heated at 70° C. and aged for 1 hour to obtain a slurry dispersion of hydrophobic treated colloidal silica. Although the dispersion was further aged for 3 hours with stirring under a reflux condition, aggregated products of the hydrophobic treated colloidal silica were obtained in a large amount during aging, and resistance against stirring was increased and stirring could not be performed. Therefore, the production was stopped.

Comparative Example 4

A commercially available acidic aqueous silica sol (trade name: SNOWTEX (registered trade mark)-O, manufactured by Nissan Chemical Industries, Ltd., silica concentration: 20 mass %, pH 3.0, particle diameter based on BET method: 12 nm) was distilled by vacuum distillation using a rotary evaporator while adding isopropanol. This procedure was continued until a silica sol dispersed in isopropanol having a silica concentration of 33 mass % and a water content of 5.7 mass % was obtained. Then, in a 1 L-glass reactor equipped with a stirrer, a dropping funnel, a condenser and a thermometer, 364 g of the silica sol dispersed in isopropanol, 177 g of isopropanol (IPA), and 59 g of pure water were added to prepare a silica sol in mixed solvent having a silica concentration of 20.0 mass %, an IPA concentration of 66.7 mass % and a water content of 13.3 mass %. The silica sol in mixed solvent was heated to 65° C., and 62 g (1.4 mmol per surface area 100 $m^2$ of the hydrophilic colloidal silica) of hexamethyldisilazane was added dropwise therein. Heating and mixing were continued and the resulting mixture was remarkably increased in viscosity, and the content could not be stirred. Therefore, the production was stopped.

Comparative Example 5

In a 1 L-glass reactor equipped with a stirrer, a dropping funnel, a condenser and a thermometer, 100 g of a commercially available precipitated silica powder (trade name: Zeosil (registered trade mark) 1165 MP, manufactured by Rhodia, silica concentration: 90 mass %, specific surface area: 165 $m^2/g$, laser diffraction dispersion particle diameter: 273 μm), 135 g of isopropanol (IPA), and 215 g of pure water were added to prepare a slurry dispersion of precipitated silica having a silica concentration of 20.0 mass %, an IPA concentration of 30.0 mass % and a water content of 50.0 mass %. The slurry dispersion of precipitated silica was heated to 65° C., and 45 g (1.9 mmol per surface area 100 $m^2$ of the hydrophilic colloidal silica) of hexamethyldisilazane was added dropwise therein. The slurry dispersion was mixed for 30 minutes, then heated at 70° C. and aged for 1 hour. The aged dispersion was further aged for 3 hours with stirring under a reflux condition to obtain a slurry dispersion of hydrophobic treated precipitated silica. The hydrophobic treated precipitated silica in a state of slurry and a liquid phase were separated by filtration through Buchner funnel (qualitative filter paper No. 131 manufactured by Advantec), and cake of the obtained hydrophobic treated precipitated silica was dried at 120° C. Then, the dried hydrophobic treated precipitated silica was ground with a mill for powder, and further dried at 200° C. to obtain 98 g of hydrophobic silica powder. The obtained hydrophobic silica powder was merely wetted in methyl ethyl ketone, and was not re-dispersed therein in a state of sol.

Evaluation

Analytical Method of Hydrophobic Silica Powder (1) Carbon Content in Hydrophobic Silica Powder The carbon content of the obtained hydrophobic silica powder was measured with CHNS/O analyzer (PE 2400 series II, manufactured by Perkin Elmer Inc.). The number of trimethylsilyl groups per unit surface area of hydrophobic silica powder (unit: $/nm^2$) was calculated according to the following equation (α):

A: trimethylsilyl group-content (mass %)=carbon content (mass %)×(73.19/36.03);

B: number of trimethylsilyl groups per 1 g of hydrophobic silica powder=$6.02 \times 10^{23} \times (A/73.19) \times 10^{-2}$;

C: surface area ($nm^2$) per 1 g of hydrophobic silica powder=specific surface area of hydrophobic silica powder ($m^2/g$)×$10^{18}$× solid content (mass %)×$10^{-2}$:

The number of trimethylsilyl groups per unit surface area of hydrophobic silica powder (unit: $/nm^2$)=B/C (α).

In the meanwhile, the solid content means calcination residue obtained by calcining the obtained hydrophobic silica powder at 800° C.

(2) Dispersion Particle Diameter of Hydrophobic Silica Powder

The obtained hydrophobic silica powder was dispersed in methyl ethyl ketone and the dispersion particle diameter was measured based on a dynamic light scattering method (sub-micron particle analyzer model N4, manufactured by Beckman Coulter, Inc.).

(3) Hydrophobic Degree 0.20 g (0.20±0.01 g) of a silica powder sample was weighed and added to 50 ml of pure water in 100 cc-glass beaker, and thus the silica powder was floated on the surface of the liquid. While the liquid was stirred by a magnetic stirrer, methanol was infused into the liquid by a burette with avoiding direct contact with the powder sample, and the point that no silica powder sample was observed on the surface of the liquid was regarded as an end-point. The hydrophobic degree was determined according to the following equation: Hydrophobic degree=X/(50+X)×100 wherein X is an amount of methanol used up to the end-point.

(4) Evaluation of Dispersion Property in Organic Solvent 1 g of the obtained hydrophobic silica powder was added in 9 g of methyl ethyl ketone in 20 cc-glass vial, and mixed with a magnetic stirrer for 30 minutes, and then dispersed in a commercially available ultrasonic washing machine to prepare a dispersion. Then, the obtained dispersion was suitably diluted with methyl ethyl ketone, and the dispersion particle diameter was measured based on a dynamic light scattering method (sub-micron particle analyzer model N4, manufactured by Beckman Coulter, Inc.).

As precipitated components were present in the dispersion in Comparative Examples 1 and 2, the measurements were carried out by using the supernatants suitably diluted. In addition, the sample of Comparative Example 5 was not dispersed in a state of sol and could not be subjected to the dynamic light scattering method. Therefore, the dispersion particle diameter thereof was measured with laser diffraction particle size distribution measuring apparatus (trade name: SALD-7000 manufactured by Shimadzu Corporation). The evaluation of dispersion property in organic solvent was performed by comparing the dispersion particle diameter of hydrophobic silica powder with the dispersion particle diameter of aqueous silica sol used as a starting material.

The results of the above-mentioned evaluation are shown in Tables 1 and 2.

TABLE 1

| | Added amount of hexa-methyldisilazane (mmol/ hydrophilic silica 100 m²) | SiO₂ concentration in silica sol in mixed solvent (mass %) | IPA concentration in silica sol in mixed solvent (mass %) | IPA/ water mass ratio | Carbon content in hydrophobic silica powder (mass %) |
|---|---|---|---|---|---|
| Example 1 | 1.4 | 20.0 | 30.0 | 0.6 | 3.2 |
| Example 2 | 3.9 | 23.3 | 21.5 | 0.4 | 0.47 |
| Example 3 | 5.0 | 25.0 | 15.0 | 0.3 | 0.28 |
| Example 4 | 3.9 | 23.3 | 21.5 | 0.4 | 0.48 |
| Example 5 | 5.0 | 25.0 | 15.0 | 0.3 | 0.28 |
| Comparative Example 1 | 3.9 | 10.5 | 6.7 | 0.1 | 0.36 |
| Comparative Example 2 | 1.4 | 11.0 | 66.7 | 3.0 | 2.8 |
| Comparative Example 3 | 3.9 | 23.3 | 5.0 | 0.07 | — |
| Comparative Example 4 | 1.4 | 20.0 | 66.7 | 5.0 | — |
| Comparative Example 5 | 1.9 | 20.0 | 30.0 | 0.6 | 3.5 |

| | Number of trimethylsilyl groups per unit surface area of hydrophobic silica powder (Number/nm²) | Dispersion particle diameter (nm) | Hydrophobic degree (%) |
|---|---|---|---|
| Example 1 | 2.4 | 67 | 55 |
| Example 2 | 2.3 | 152 | 54 |
| Example 3 | 2.2 | 212 | 53 |
| Example 4 | 2.4 | 160 | 54 |
| Example 5 | 2.2 | 213 | 53 |
| Comparative Example 1 | 1.8 | 196 | 47 |
| Comparative Example 2 | 2.1 | 170 | 53 |
| Comparative Example 3 | — | — | — |
| Comparative Example 4 | — | — | — |
| Comparative Example 5 | 3.6 | 73 µm | 60 |

TABLE 2

| | Dispersion particle diameter of aqueous silica sol as starting material (nm) | Dispersion particle diameter of hydrophobic silica powder (nm) | Production of slurry dispersion of hydrophobic treated colloidal silica | Formation of granule of hydrophobic treated colloidal silica | Re-dispersion property in methyl ethyl ketone |
|---|---|---|---|---|---|
| Example 1 | 36 | 67 | ○ | ○ | ○ |
| Example 2 | 125 | 152 | ○ | ○ | ○ |
| Example 3 | 200 | 212 | ○ | ○ | ○ |
| Example 4 | 125 | 160 | ○ | ○ | ○ |
| Example 5 | 200 | 213 | ○ | ○ | ○ |
| Comparative Example 1 | 125 | 196 | x (sol) | — | A (with precipitate) |
| Comparative Example 2 | 36 | 170 | x (gel) | — | A (with precipitate) |
| Comparative Example 3 | 125 | — | ○ | x (increased viscosity, gelation) | — |
| Comparative Example 4 | 36 | — | x (increased viscosity, gelation) | — | — |
| Comparative Example 5 | 263 µm | 73 µm | ○ | — | x (no dispersion in sol) |

As mentioned above, the production of the present invention makes possible to produce a hydrophobic silica powder by using a simple apparatus and an easy hydrophobic treatment process. The hydrophobic silica powder obtained by the present invention is useful for external agents for toner used for electrophotography, internal agents used for resins, hard coat agents, water repellency-affording agents, flame retardants and the like.

What is claimed is:

1. A process for producing a hydrophobic silica powder comprising the steps for hydrophobic treatment of:
   adding to a silica sol in mixed solvent having a silica concentration of 5 to 50 mass % obtained by mixing an aqueous silica sol containing hydrophilic colloidal silica having a specific surface area of 5.5 to 550 m²/g with a hydrophilic organic solvent in a mass ratio of 0.12 to 2.5 based on water in the aqueous silica sol, a disilazane compound of formula (1)

$$(R^1{}_3Si)_2NH \qquad (1)$$

wherein each $R^1$ is $C_{1-6}$alkyl group or phenyl group that is selected independently of one another, in an amount of 0.1 to 20 mmol per surface area 100 m² of the hydrophilic colloidal silica, to obtain a mixture of the silica sol in mixed solvent and the disilazane compound; and
   heating the mixture at a temperature of 50 to 100° C. for aging to obtain a slurry dispersion of hydrophobic treated colloidal silica.

2. The process for producing a hydrophobic silica powder according to claim 1, further comprising a step in which the obtained slurry dispersion of hydrophobic treated colloidal silica is heated at a temperature of 50 to 100° C. with stirring for aging, thereby the hydrophobic treated colloidal silica is granulated in a granular shape in the dispersion.

3. The process for producing a hydrophobic silica powder according to claim 1, comprising the steps (A), (B), (C) and (D) of:
(A): hydrophobic treatment step of adding to a silica sol in mixed solvent having a silica concentration of 5 to 50 mass % obtained by mixing an aqueous silica sol containing hydrophilic colloidal silica having a specific surface area of 5.5 to 550 m²/g with a hydrophilic organic solvent in a mass ratio of 0.12 to 2.5 based on water in the aqueous silica sol,
a disilazane compound of formula (1)

$(R^1_3Si)_2NH$                               (1)

wherein each $R^1$ is $C_{1-6}$ alkyl group or phenyl group that is selected independently of one another, in an amount of 0.1 to 20 mmol per surface area 100 m² of the hydrophilic colloidal silica, to obtain a mixture of the silica sol in mixed solvent and the disilazane, and heating the mixture at a temperature of 50 to 100° C. for aging to obtain a slurry dispersion of hydrophobic treated colloidal silica;
(B): step of heating the slurry dispersion of hydrophobic treated colloidal silica obtained in the step (A) at a temperature of 50 to 100° C. with stirring for aging, thereby granulating the hydrophobic treated colloidal silica in a granular shape in the dispersion;
(C): step of separating the hydrophobic treated colloidal silica granulated in a granular shape that is obtained in the step (B) from a liquid phase of the dispersion; and
(D): step of drying a cake of the granular hydrophobic treated colloidal silica obtained in the step (C).

4. The process for producing a hydrophobic silica powder according to claim 1, wherein hexamethyl disilazane is used as the disilazane compound of formula (1).

5. The process for producing a hydrophobic silica powder according to claim 2, wherein hexamethyl disilazane is used as the disilazane compound of formula (1).

6. The process for producing a hydrophobic silica powder according to claim 3, wherein hexamethyl disilazane is used as the disilazane compound of formula (1).

* * * * *